(12) United States Patent
Ai et al.

(10) Patent No.: US 7,876,965 B2
(45) Date of Patent: Jan. 25, 2011

(54) APPARATUS AND METHOD FOR DETECTING A PARTICULAR SUBJECT

(75) Inventors: Haizhou Ai, Beijing (CN); Chang Huang, Beijing (CN); Yuan Li, Beijing (CN); Shihong Lao, Kyoto (JP)

(73) Assignees: Omron Corporation, Kyoto (JP); Tsinghua University, Beijing (CN)

( * ) Notice: Subject to any disclaimer, the term of this patent is extended or adjusted under 35 U.S.C. 154(b) by 1147 days.

(21) Appl. No.: 11/543,158

(22) Filed: Oct. 5, 2006

(65) Prior Publication Data

US 2007/0086660 A1 Apr. 19, 2007

(30) Foreign Application Priority Data

Oct. 9, 2005 (CN) .................. 2005 1 0108159
Sep. 22, 2006 (CN) .................. 2006 1 0127853

(51) Int. Cl.
*G06K 9/70* (2006.01)
(52) U.S. Cl. .................. 382/226; 382/118; 382/159
(58) Field of Classification Search ............ 382/118, 382/159, 226
See application file for complete search history.

(56) References Cited

U.S. PATENT DOCUMENTS

| 6,988,093 | B2 * | 1/2006 | Pic et al. | .............. | 1/1 |
| 2005/0184774 | A1 * | 8/2005 | Kaizuka | .............. | 327/157 |
| 2005/0213810 | A1 * | 9/2005 | Sabe et al. | .............. | 382/159 |
| 2005/0220336 | A1 | 10/2005 | Sabe et al. | | |
| 2007/0086660 | A1 * | 4/2007 | Ai et al. | .............. | 382/226 |

OTHER PUBLICATIONS

Y.Y. Lin and T.L. Liu, "Robust face detection with multi-class boosting", Proc. IEEE Conference on Computer Vision and Pattern Recognition, Jun. 20, 2005, pp. 680-687, vol. 1.
Fröhba and A. Ernest, "Fast frontal-view face detection using a multi-path decision tree", Lecture Notes in Computer Science, 2003, pp. 921-928, vol. 2688, Springer-Verlag, Berlin Heidelberg.
Z. Yang et al, "Face pose estimation and its application in video shot selection", proc. Intl. Conf. on Pattern Recognition, Aug. 23, 2004, pp. 322-325, vol. 1.
M. Jones and P. Viola, "Fast multi-view face detection", Technical Report, Mitsubishi Research Laboratories No. TR2003-96, Jun. 2003, pp. 1-8.
Chang Huang et al, "Omni-directional face detection based on real adaboost", International Conference on Singapore, Oct. 2004, pp. 593-596, vol. 1.

(Continued)

*Primary Examiner*—Gregory M Desire
(74) *Attorney, Agent, or Firm*—Dickstein Shapiro LLP

(57) ABSTRACT

An apparatus and a method for detecting from an image a particular subject corresponding to multiple views of the subject by dividing a particular subject space into a plurality of subject subspaces and further dividing a subject subspace into subject subspaces representing multiple views; configuring a tree-structured detector wherein the tree structure has a root node that covers all subject subspaces and has a plurality of branches, each branch corresponding to a child node that covers at least one subject subspace; training each node to determine which nodes in the adjacent lower layer the images of the subject in the corresponding nodes should be sent.

16 Claims, 11 Drawing Sheets

OTHER PUBLICATIONS

Rowley, H. A., Neural Network-based Human Face Detection, Ph.D. Thesis, Carnegie Mellon University, May 1999.

Schneiderman, H., et al., A Statistical Method for 3D Object Detection Applied to Faces and Cars, CVPR 2000.

Viola, P., et al., Rapid Object Detection Using a Boosted Cascade of Simple Features, CVPR 2001.

Xiao, R. et al., Boosting Chain Learning for Object Detection, ICCV 2003.

Liu, C., et al., Kullback-Leibler Boosting, CVPR 2003.

Li, S. Z., et al., Statistical Learning of Multi-View Face Detection, ECCV 2002.

Jones, M., et al., Fast Multi-view Face Detection. MERL-TR2003-96, Jul. 2003.

Wu, B., et al., Fast Rotation Invariant Multi-View Face Detection Based on Real Adaboost, FG 2004.

Schapire, R. E., et al., 8909808 m Improved Boosting Algorithms Using Confidence-rated Predictions, Machine Learning, 37(3), 1999, 297-336.

Freund, Y., et al., Experiments with a New Boosting Algorithm. In Proc. Of the 13$^{th}$ Conf. on Machine Learning, Morgan Kaugmann, 1996, 148-156.

Schapire, R. E., et al., Boosting the Margin: A new Explanation for the Effectiveness of Voting Methods, The Annals of Statistics, 26(5), 1998, 1651-1686.

\* cited by examiner

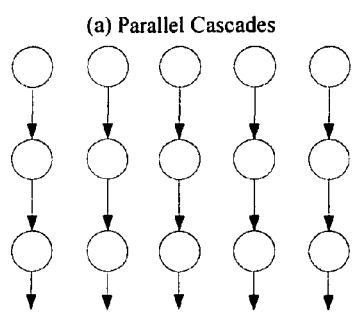
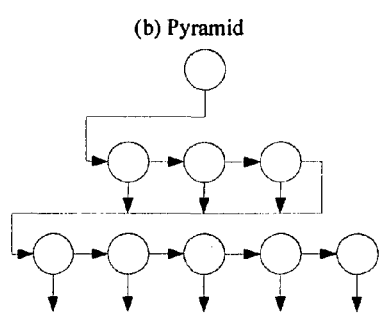
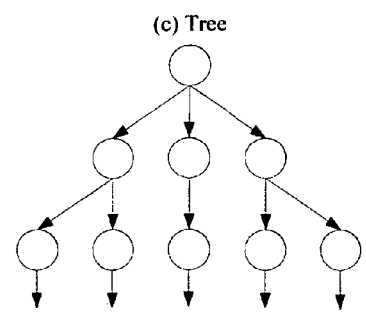
Fig. 1A  
PRIOR ART
Fig. 1B  
PRIOR ART
Fig. 1C  
PRIOR ART

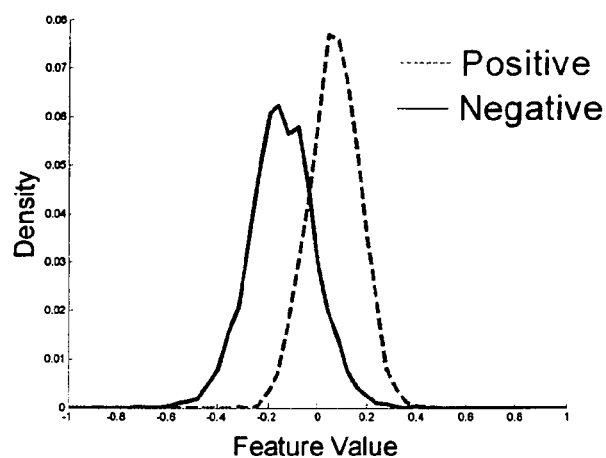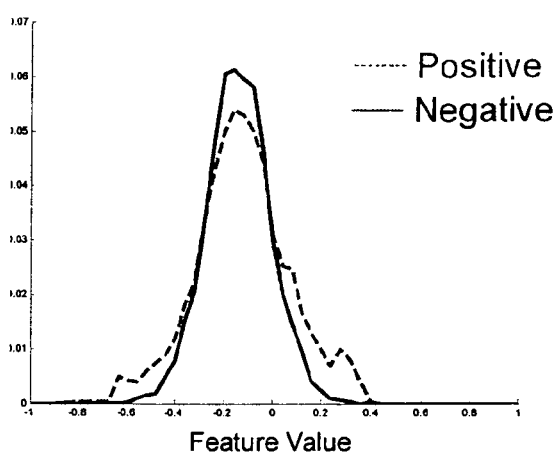
Fig. 4A                    Fig. 4B

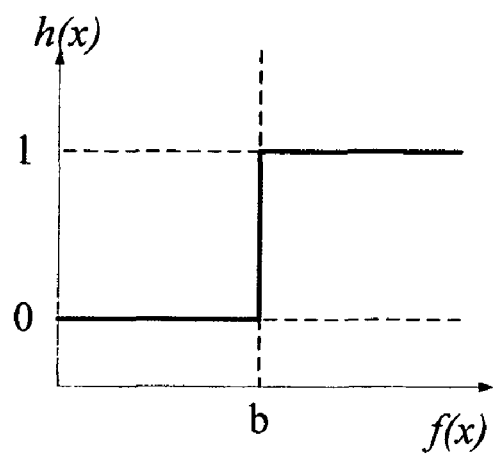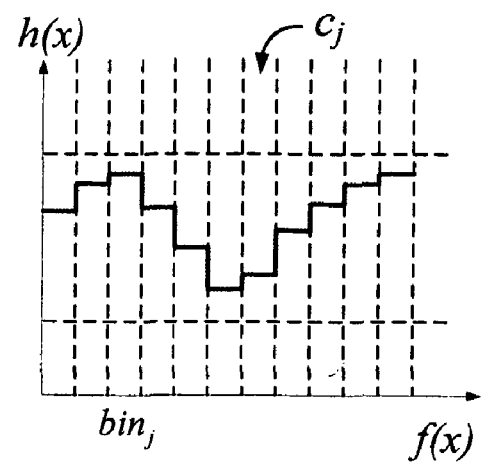
(a) Threshold-type function    (b) Piece-wise function
Fig. 5A    Fig. 5B
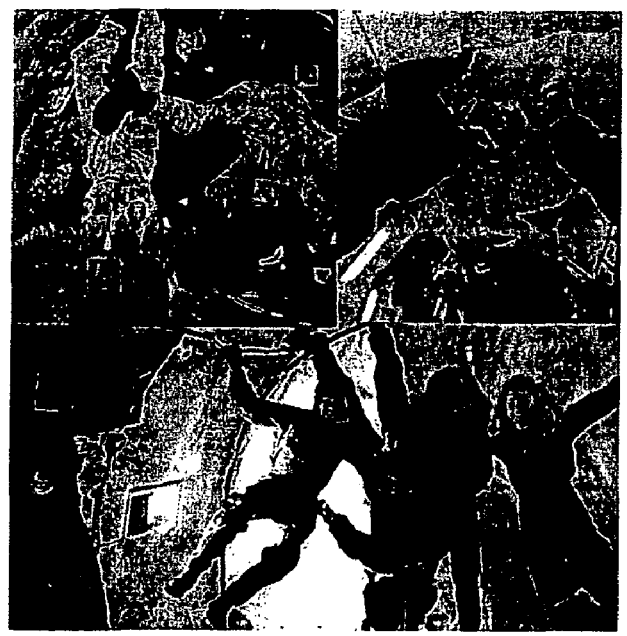
Fig. 6

APPARATUS AND METHOD FOR DETECTING A PARTICULAR SUBJECT

BACKGROUND OF THE RELATED ART

1. Field of the Invention

The present invention relates to an effective technique applied in an apparatus and a method for detecting from a picked-up image a particular subject (such as a human, an animal, an object and the like) or a portion thereof contained in the image.

2. Description of the Related Art

As a conventional art, there is one that detects from a picked-up image a particular subject (such as a human, an animal, an object and the like) or a portion thereof contained in the image. As an example of such conventional art, there is one that detects faces of human from a picked-up image, i.e. face detection technique.

Face detection is, for a given image, to search it using a certain processing by a computer to determine whether a face is contained therein.

Difficulties of face detection lie in two aspects: one is the intrinsic variation of face, such as difference of the face shape; the other is the extrinsic variation of face, such as rotation in plane.

Some early works on face detection include for instance, Rowley's ANN method and Schneiderman's method based on Bayesian decision rule. Schneiderman's method partitions a face into three views as the left profile, the frontal profile and right profile, respectively, and trained three detectors based on views by using Bayesian method and wavelet transformation. The final result is obtained by combining the results from the three detectors. Schneiderman's has contributed greatly to the solution of multi-view face detection.

In terms of proposing a cascaded classifier for improving speed, there have been many related works such as Xiao et al.'s Boosting chain algorithm and Liu et al.'s Kullback-Leibler Boosting algorithm (KL Boosting). These Boosting algorithms focused on some parts of the basic framework and adopted new methods for improvement.

In recent years, the cascade classifier for face detection has been proved very successful and efficient. However, for multi-view face detection (MVFD), the most straightforward way of extending their framework is to train a different cascade classifier respectively for each view and then use them as a whole like FIG. 1A. While Bo Wo, et al., discuss the possibilities in extending even such a simple framework for the problem of multiple views, two different approaches have also been proposed:

1. Pyramid Structure

In "Statistical Learning of Multi-View Face Detection", ECCV 2002, Li, et al., proposed a pyramid-structured multi-view face detector to detect faces with various poses. As shown in FIG. 1B, the pyramid structure has only one node (main node) in the top layer, the node covering ±90° rotation out-of-plane (ROP), and has three nodes (child nodes) in the second layer, these three nodes dividing the space into three parts. Then the space is subdivided layer by layer. The pyramid structure adopts coarse-to-fine strategy to handle pose variations of ROP. Due to the similarities that exist in different poses of faces, the pyramid method treats them as one ensemble positive class so as to improve the efficiency of face features extraction.

2. Decision Tree Structure

The decision tree structure is as shown in FIG. 1C. Contrary to the above pyramid method, a decision tree method has been proposed in order to detect face with various poses and one solution has been taught for the issue of RIP (rotation-in-plane). The decision tree method puts emphasis upon the diversities among different poses and the decision tree works as a pose estimator of RIP. With the imperative judgments made by the decision tree, it truly reduces the time spent on pose estimation significantly.

SUMMARY

A first embodiment according to the invention includes an apparatus for detecting from an image a particular subject including: an image input unit; and a tree-structured detector for classifying an image inputted from the image input unit; wherein the tree structure detector has a root node that covers subject subspaces of all views of a subject to be branched; a child node branched from the root node covers the subject subspaces corresponding to at least one views of the subject; each of the root node and the child node contains a plurality of weak classifiers and collects the output of each weak classifier for each of the divided subject subspace so as to determine to which child node in the adjacent lower layer the image should be shifted.

Furthermore, each node includes one strong classifier and this strong classifier may be decided depending on an output value of a plurality of weak classifiers. By using the plurality of weak classifiers, the values of the plural weak classifiers can be collected for each of a plurality of subject subspaces which should be determined by the strong classifier at a certain node. Therefore, accuracy is improved and efficient calculation can be carried out.

A second embodiment according to the invention provides a method for detecting a particular subject from an image wherein an information process device executes the steps including inputting the inputted image in a root node of a tree-structured detector; determining which child node in the adjacent lower layer the image should be shifted to at each branched node of the root node and a child node of the tree-structured detector by inputting the image in a plurality of weak classifiers and collecting the output of each weak classifier for each divided subject subspace.

A third embodiment according to the invention provides a method for configuring a tree-structured detector for detecting a particular subject from an image; wherein an information process device executes the steps including: configuring a node for classifying the image into a tree structure; configuring a root node of the tree structure so as to cover subject subspaces of divided all views of the subject and have a plurality of branches, wherein each branch is connected to a child node, and this child node corresponds to at least one view of the subjects; configuring a child node covering two or more subject subspaces so as to have a plurality of branches, wherein each branch is connected to the child node of the adjacent lower layer, and each child node of the adjacent lower layer covers at least one subject subspace; configuring a child node covering at least one subject subspace to be made into a leaf node of a tree structure; and configuring each of the root node and the child node in such a manner that an image is inputted in a plurality of weak classifiers and the outputs of each weak classifier are collected for each divided subject subspace to determine to which child node in the adjacent lower layer the image should be shifted.

BRIEF DESCRIPTION OF THE DRAWINGS

FIG. 1A is a schematic diagram of parallel cascade structure;

FIG. 1B is a schematic diagram of pyramid structure;

FIG. 1C is a schematic diagram of decision tree structure;

FIG. 4A and FIG. 4B show an example of the distributions on Haar features;

FIG. 5A is a diagram showing features of threshold-type weak classifier;

FIG. 5B is a diagram showing features of piece-wise-type weak classifier;

FIG. 6 is a diagram showing exemplary rotation invariant MVFD results;

DETAILED DESCRIPTION

Figure 2:
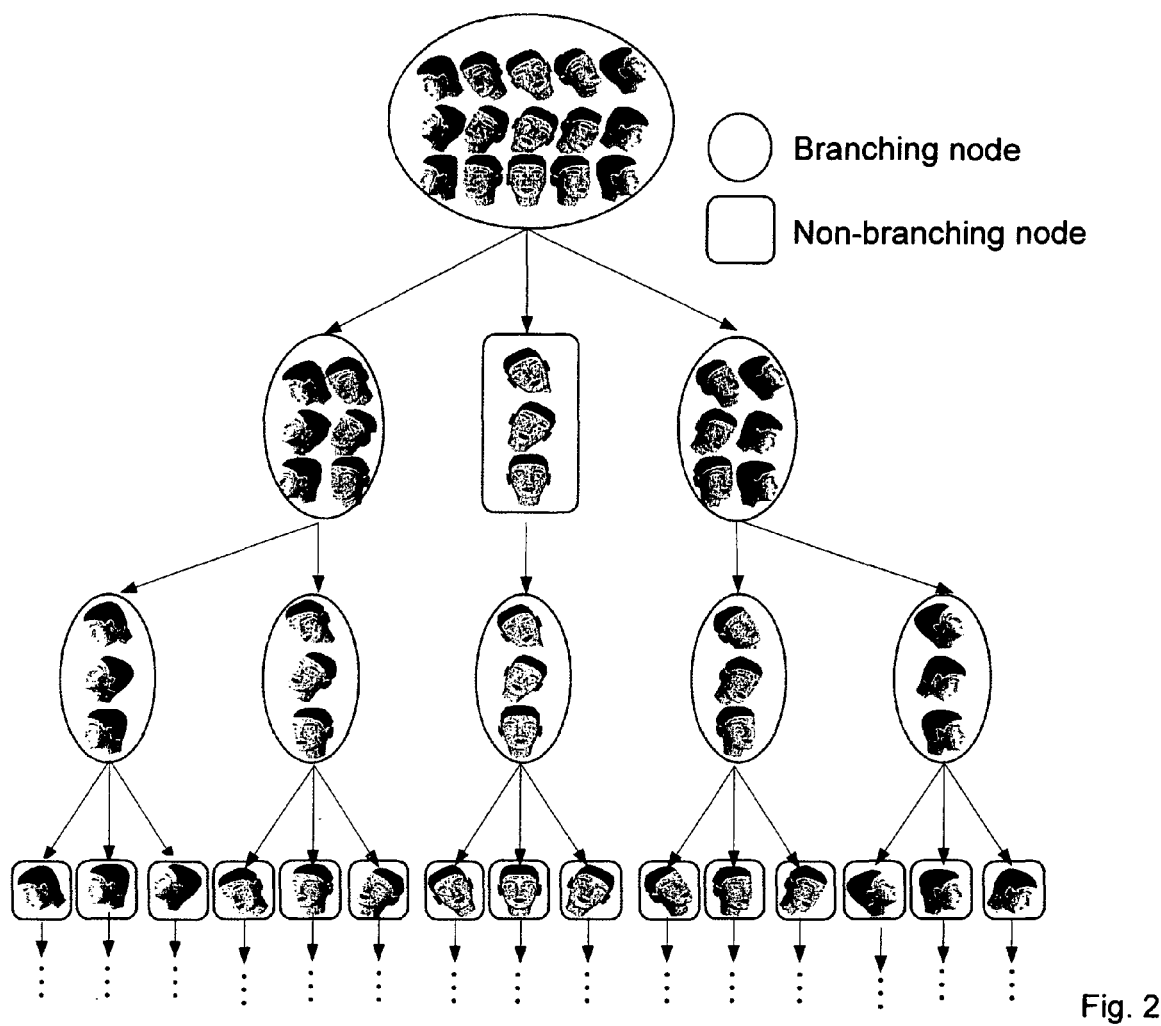
FIG. 2 is a schematic diagram of tree structure according to an embodiment of the invention.

In the following description, a tree-structured detector (Refer to FIGS. 8a and 8b) for detecting faces of human from human images will be described as a specific example of the particular subject detection apparatus.

There are two main tasks for MVFD: one is to distinguish between faces and non-faces; the other is to identify the pose of a face. The first task needs to reject non-faces as quickly as possible, so it is inclined to find the similarities of faces of different poses so as to separate them from non-faces, while the latter task focuses on the diversities among different poses. The conflict between the two tasks really leads to the dilemma that either treating all faces as a single class (as in the pyramid method) or treating them as different individually separated classes (as in the decision tree method), both of which are unsatisfactory for MVFD. The difficulty of solving such problem exists in the fact that variations of face poses (including RIP and ROP) may generally lead to notable variations of structure and texture in the views, thereby complexity of classification increases.

In order to solve the problem, the pyramid model and the decision-tree model are proposed respectively. Here the former adopts coarse-to-fine strategy to divide the multi-view face space into single-view face element spaces according to variation degree of poses and a classifier design employing pyramid structure is used to separate multi-view faces from non-faces step by step.

While the latter classifies the multi-view faces directly employing decision tree, and then selects corresponding cascade classifiers according to the result of classification to separate the face from non-faces in respective pose. In short, pyramid structure treats faces of different poses as one class and puts emphasis on solving the classification problem between them and non-faces. As face space is divided more and more finely, reasonable pose estimation will be achieved with pyramid method. While the method of decision tree firstly solves the pose estimation problem and separates faces of different poses by the multi-classification, then returns to the conventional cascade model to solve the classification problem between faces and non-faces for a certain pose.

These two methods adopt different orders to solve the two aspects of MVFD problem: face detection and pose estimation, which results in different problems for them. The pyramid structure puts emphasis on the similarities that exist in different poses of faces so as to attempt to directly separate complicated multi-view faces from non-faces.

Such classification is very difficult and needs to configure a complicated classifier. Therefore although good detection accuracy is achieved, speed is unsatisfactory. While decision tree structure puts emphasis on the diversities among different poses of faces, it firstly configures a classifier to classify them into multiple classes and then separates them from non-faces respectively. The method's speed is satisfactory, whereas accuracy and robustness are unsatisfactory because multi-classification itself of face poses is a problem difficult to solve. Also the method expects to determine face poses quickly using decision tree, which inevitably result in loss in accuracy and practical utility. In general, concomitance of the similarities and diversities among different poses of faces is a key problem that cannot be overcome by the above two methods.

As a matter of fact, requirements necessary for practical applications still cannot be met by current methods due to the ubiquitous concomitance of RIP and ROP in the images of real-life faces. For example, as MVFD, rotation invariant is required. Although these problems may be solved by rotating the image and applying MVFD several times, it significantly increases computation complexity and false alarms.

Several embodiments of the invention provide a multi-view detection method and apparatus for detecting a particular subject, which balances these two aspects in the above pyramid method and decision tree method, so as to enhance the multi-view detection in both accuracy and speed to improve the efficiency of related detection apparatus. These embodiment(s) will be described below with reference to the drawings.

In the following description, a so-called human image is an image at least containing a part of or whole image of a human face. Therefore, a human image may be an image containing a whole human or an image containing a human face or other part of the body. Additionally, a human image may be an image containing a plurality of humans, and a human image may contain any graphics such as scenery (including the object of interest as the subject), patterns, etc., other than humans in the background.

Additionally, the following description of tree-structured detector is only an example, and the configuration of tree-structured detector is not limited to the following description.

Embodiment 1

As shown in FIG. 2, an embodiment of the invention provides a multi-view face detection method, including the steps of dividing a face space into face subspaces for multiple views, for instance, rotating a face by ±90° ROP, getting face subspaces of five views of frontal, left half profile, left full profile, right half profile and right full profile, then rotating these face subspaces of five views by ±45° RIP so that face subspace of each view derives two face subspaces of RIP (such as ±30° RIP) to divide the face space into face subspaces of 15 views.

The rotation out-of-plane is the rotation around the Z-axis; however, this rotation may be that around the X-axis. In the case of the rotation around the X-axis, on the image, the face is inclined and viewing of the face is changed into upward. According to this definition of the axis, the rotation around the Y-axis is equivalent to rotation in plane. In other words, in a three-dimensional space where each of X, Y, and Z axes to be at right angles to each other, the rotation in plane can be defined as the rotation around the Y-axis. In this case, the rotation out-of-plane becomes the rotation around the Z-axis and the subject is directed right and left. In addition, the rotation around the X-axis is also the rotation out-of-plane, and the subject is directed right and left.

Configuring a width-first-search tree-structured detector wherein the tree structure has a root node that covers the divided face subspaces of all views (i.e. face subspaces of 15 views in the above face division example) and has a plurality of branches, each branch corresponding to a child node that covers at least the face subspace of one view, wherein child node covering the face subspaces of more than one view has a plurality of branches. In addition, the child node may be non-branching. In this case, non-branching implies that the child node is shifted to a lower layer without (further) dividing the face subspace.

Each branch corresponding to a child node in an adjacent lower layer that covers at least the face subspace of one view, and child node covering the face subspace of only one view is the leaf node of the tree structure.

A Vector Boosting algorithm is used to train each node as a determinative vector to determine which nodes in the adjacent child node of the lower layer the face images in the corresponding nodes should be sent to; a width-first-search is adopted when browsing all active nodes in the tree structure.

Rejection of non-faces, and obtaining faces of corresponding views is done by single-branch cascade classification of the leaf nodes.

I. Width-First-Search (WFS, Width First Search or BFS, Breadth First Search) Tree-Structured Detector Covering the face space with ±45° RIP and ±90° ROP, the proposed detector adopts a coarse-to-fine strategy to divide the entire face space into smaller and smaller subspaces as shown in FIG. 2. The root node that covers the largest space is partitioned into left profile, frontal and right profile views in the second layer to describe the ROP more accurately, and full-profile and half-profile views are defined in the next layer below; finally in the fourth layer, each view is split into three categories according to their different RIP.

The tree-structured detector of an embodiment according to the invention will not make exclusive selection of the path for a sample like the decision tree method. Instead, each node computes a determinative vector G(x) to determine which child nodes the image should be sent to. For example, in the root node of FIG. 2, a sample's determinative vector is G(x)=(1, 1, 0), which means it may be a left profile face or a frontal one but can not be a right profile one, so in the second layer, it will be sent to the left node and the middle node but not the right one. In another sample, G(x)=(0, 0, 0), which means the sample is independent of any child node and will be rejected immediately. When traversing all active nodes in the tree, a Width-First-Search strategy is adopted, and its pseudo code is given below:

0. (Input) Given a sample x and a constructed tree detector T.

1. (Initialization) Set a node list L empty; push the root node of T into L; empty an output list O.
2. (WFS procedure)
   While L is not empty, do
   1) Pop a first node d from L.
   2) Calculate a determinative vector G(d)(x), where $G^{(d)}(x)=[g_1^{(d)}(x),\ldots,g_n^{(d)}(x)]$ 3) For t=1, ..., n:

If $g_t^{(d)}(x)=1$

Get the $t$-$^{th}$ child node $s_i$ of d
   If $s_i$ is a leaf node
   Push $I_i$, the label of $s_i$, into the list O.
   Else
   Push $s_i$ into the list L.
   End if
   End if
   End for
   End do
3. (Output) Output all labels in the list O for sample x.

Figure 3:
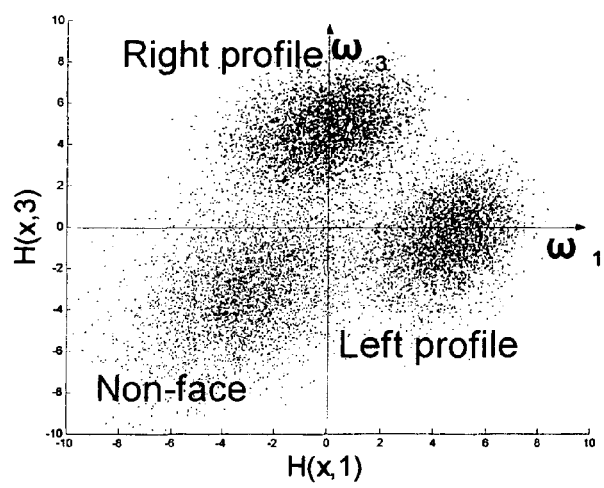
FIG. 3 shows the distribution of three classes in the output space H(x) according to an embodiment of the invention.
Figure 7:
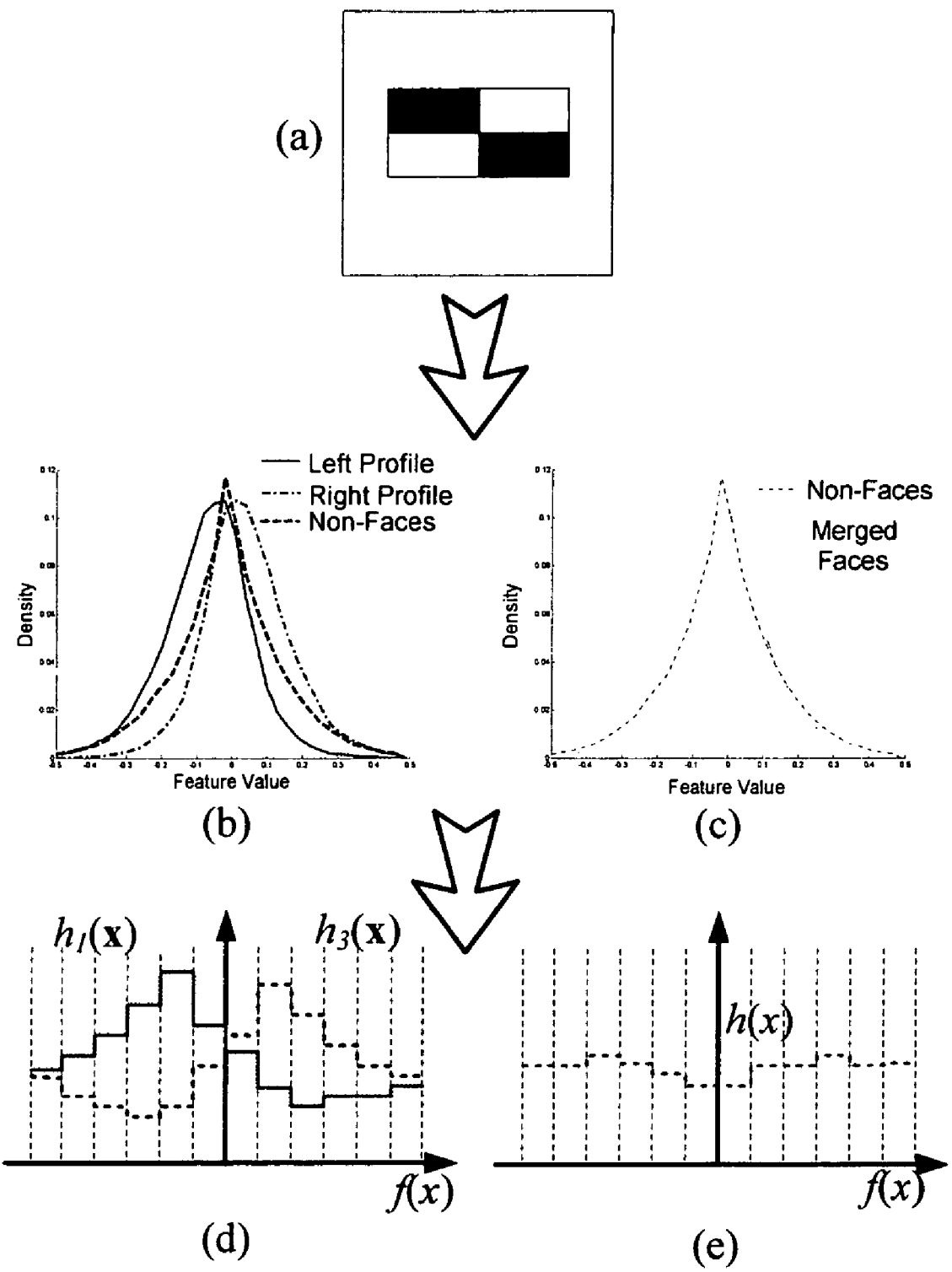
FIGS. 7A to 7E are comparison diagrams showing feature discrimination effects of the Vector Boosting algorithm on the tree structure of an embodiment of the invention and the Real AdaBoost algorithm in the pyramid structure.

Width-First-Search strategy in the tree-structured detector is shown in FIG. 3. In fact, the WFS tree method does not try to give quick pose estimation like those previously proposed, which amounts to loss in accuracy, nor does it simply merge different poses without consideration of their in-class differences like in Li, et al., which amounts to loss in speed. Hence, the WFS tree can outperform them by means of paying attention to both diversities and similarities among various poses, which guarantees both high accuracy and faster speed.

From the discussion above, it is obvious that the node plays an important role in the WFS tree. To support this new technique, in an embodiment according to the invention, a newly extended version of the Real AdaBoost named Vector Boosting is introduced. With its help, the nodes are trained for the required determinative vector G(x) fast and accurately.

II. Vector Boosting Algorithm

The Vector Boosting is proposed as an extended version of the Real AdaBoost in which both its weak classifier and its final output are vectors rather than scalars. The original inspiration of Vector Boosting is drawn from the multi-class multi-label (MCML) version of the Real AdaBoost, which assigns a set of labels for each sample and decomposes the original problem into k orthogonal binary ones.

The major problem of this algorithm is that for each binary classification problem, a sample is regarded as either positive or negative. However, in many complicated cases, it is not tenable since some samples are neither positive nor negative for certain binary classification problems of which they are independent, which makes the MCML version of Real AdaBoost inapplicable. Take the root node of the WFS tree in FIG. 2 for example, a frontal face image makes the determinative vector G(x)=(*, +1, *), wherein * can be either +1 or −1, i.e., the first (i.e. for left profile face) and the third (i.e. for right profile face) binary classifications are independent of frontal face images. Once a complicated classification problem is decomposed into a set of binary ones, Vector Boosting will deal with them in 3 unified framework by means of a shared output space of multi-components vector. Each binary problem has its own "interested" direction in this output space that is denoted as its projection vector. In this method, different binary problems are not necessarily independent (with orthogonal projection vectors); they could also be correlated (with non-orthogonal projection vectors) in general.

Let $s=\{(x_1, v_1, y_1), K, (x_m, v_m, y_m)\}$ be a sequence of training samples where $x_i$ belongs to a sample space X, $v_i$ belongs to a finite k-dimensional projection vector set Ω and the label $y_i=\pm 1$ (i.e. positive or negative). The pseudo code of a generalized version of k-dimensional Vector Boosting algorithm that deals with n binary classification problems synchronously is given below.

For a classification problem that has been decomposed into n binary ones, given:
(1) Projection vector set $\Omega=\{\omega_1, \ldots, \omega_n\}$, $\omega_1 \in R^k$
(2) Sample set $s=\{(x_1, v_1, y_1), K, (x_m, v_m, y_m)\}$,
where $x \in \chi$, $v \in \Omega$ and its label $y=\pm 1$.
Initialize a sample distribution $D1(i)=1/m$,
For $t=1, \ldots, T$
Under the current distribution, train a weak classifier
$ht(x): \chi \rightarrow R^k$. (weak classifier)
Update the sample distribution $$D_{t+1}(i) = \frac{D_t(i)\exp[-y_i(v_i g h_t(x_i))]}{Z_t}, \quad (1)$$

where Zt is the normalization factor so as to keep Di+1 as a probability distribution.

The final output space is $$H(x) = \sum_{t=1}^{T} h_t(x) \quad (2)$$

The confidence space is $$F(x)=AH(x). \quad (3)$$

where the transformation matrix $A=[\omega_1, \ldots, \omega_n]'$.
The final strong classifier is $$G(x)=\mathrm{sign}(F(x)-B). \quad (4)$$

B is a threshold vector whose default value is zero.

The above is a generalized version of Vector Boosting algorithm.

The generalized Vector Boosting algorithm is configured to handle a complicated problem, which has been decomposed into n binary ones, in a k-dimensional output space. In the same way as Real AdaBoost, the weak classifier is called repeatedly under the updated distribution to form a highly accurate classifier. It should be mentioned that in the kernel update rule (equation 1), the margin of a sample $x_i$ with its label y and projection vector $v_i$ is defined as $y_i(v_i \cdot h(x_i))$ due to the vectorization of the output. Thus, the orthogonal component of a weak classifier's output makes no contribution to the updating of the sample's weight. In this way, Vector Boosting increases the weights of samples that have been wrongly classified according to the projection vector (in its "interested" direction) and decrease those of samples correctly predicted.

The final output is the linear combination of all trained weak classifiers (equation 2). To calculate the confidences for each binary problem, an n×k matrix A is employed to transform the k-dimensional output space into an n-dimensional confidence space (equation 3), so that all n projection vectors in set $\Omega$ are constructed. Each dimension of the confidence space corresponds to a certain binary problem. Finally, the strong classifier with Boolean outputs is achieved with the threshold vector B (equation 4).

Practically in the experiments, the complicated classification problem is decomposed into several orthogonal binary ones for simplification but the independences among various face poses shall be maintained. For example, when training the root node in FIG. 2, three face sets are collected, which are left profile, frontal and right profile, assigning their projection vectors as (1, 0, 0), (0, 1, 0), (0, 0, 1) respectively, and labeling them positive (i.e. $y_i=1$). After that, prepare another three non-face sets with the same projection vectors but label them negative (i.e. $y_i=1$). These three binary problems appear to be trained independently, but share the selected features so as to outperform the individually training methods in Wo, et al. FIG. 3 shows the results of three classes in the output space H(x), where H(x, 1) is the dimension for left profile view and H(x, 3) is for right profile view. (The frontal view and its corresponding projection vector are omitted here for clarity). It is true that both left profile and right profile faces can be well separated from the non-faces in this 2-D space with their own projection vectors $\omega_1$ and $\omega_3$.

It is easy to see that when n=k=1 and $\omega_1$ (the only projection vector in a) is a unit vector, Vector Boosting is exactly the same as Real AdaBoost. In fact, due to the consistency in updating rule (equation 1), Vector Boosting keeps the same training error bound as Real AdaBoost, that is, $$\text{training error } P_{error} \leq \Pi Z_t. \quad (9)$$

So far, the framework of Vector Boosting has been introduced and its predictable training error bound has been revealed, and it is explicitly described how to train weak classifiers. Below, the design of the weak classifier and the optimization method for Vector Boosting will be detailed.

III. Piece-Wise Functions

In the cascade detector, the authors use the integral image method to fast calculate the Haar feature (include Haar-like feature) f(x), wherein a weak classifier h(x) is defined as a threshold-type function with Boolean output as shown in FIG. 5a. It can be formally expressed as $h(x)=\mathrm{sign}[f(x)-b]$, where b is a threshold. Although it is simple and easy to train, it is not able to take full advantage of information from the extracted feature.

For example, as shown in FIG. 4a, positive and negative samples can be well classified by a proper threshold. However, it cannot describe their divergences accurately enough due to its coarse granularity. In addition, during the updating process of the AdaBoost algorithm, their divergences diminishes continually (e.g. FIG. 4b shows the divergences on a Haar feature selected in the fifth round), which largely weakens the discrimination power of the threshold-type function, and sometimes even hampers the convergence of the algorithm (e.g. in the lower layer of the cascade when the face and non-face patterns are very similar). In conclusion, the coarse granularity of the threshold-type weak classifier greatly impedes the improvement of the speed and accuracy of the detector.

A more efficient design for weak classifiers, the piece-wise function illustrated in FIG. 5b, divides the feature space into many bins with equal width and output a constant value for each bin. The piece-wise function is able to approximate various distributions more accurately without the constraint of Boolean output, which is essentially a symmetrical equidistant sampling process. It also meets the very requirements of the weak classifier in Real AdaBoost since it is really a natural way of providing a domain partition. Besides, as the piece-wise function can be efficiently implemented with Look Up Table (LUT), it does not bring in more computational load compared with the threshold-type function (only a multiplication is needed to convert feature value to the index of LUT), but it significantly enhances the capability of the weak classifier by means of real-valued outputs.

According to "There is no free lunch" theorem, it is very important to choose suitable granularity for a piece-wise function. The finer the granularity is, the more accurately the function can estimate (lower training error), but the more sensitive it will be to the noise and the size of training set (higher structural risk). Empirically, it is strongly suggested that in the first several layers, the granularity can be a little finer so as to make the training converge as fast as possible, while in the subsequent layers, it should be coarser to make the classification results robust.

IV. The Optimization of Weak Classifier

Reviewing equation 3, on the basis of that the training error in Vector Boosting is bounded by the product of all normalization factors, the objective of weak classifier is just to minimize this factor of current round if adopting a greedy strategy. Suppose a weak classifier $h(x; \theta, \mu)$ is characterized by two parameters: $\theta$ specifies its Haar feature and $\mu$ specifies its piece-wise function. Following an exhaustive search method, a finite redundant Haar feature set is enumerated and a piece-wise function is optimized for each feature so as to obtain the most discriminating one. Then the only unsolved problem in weak classifier is how to get the optimal piece-wise function $\mu$.

A piecewise function is configured by two parts: one is the division of feature space, the other is the output constant for each division (i.e. bin). For simplification, the first one is fixed for each feature empirically, and the latter one, the output constant for each bin, can be optimized as follows.

Suppose samples $s=\{(x_1, v_1, y_1), K, (x_m, v_m, y_m)\}$ is under the distribution of Dt(i). On a certain feature f(x), they can be grouped into many bins with the predefined division of piece-wise function. Denote them as:

$$S_1 = \{(x_1, v_1, y_1) | x_1 \in bin_j\},$$

where j is the bin index.

Let $c_j$ be the constant output for the $j$-$^{th}$ bin, and then we can get the normalization factor $$Z_t = \sum_J \sum_{S_j} D_t(i) \exp(-y_i(v_i \cdot c_j)) \tag{11}$$

For group k (bin k), the training loss is $$loss_k(c_k) = \sum_{S_k} D_t(i) \exp(-y_i(v_i \cdot c_k)) \tag{12}$$

This loss function is a convex with its independent variable $c_k$. Hence, each $c_j$ can be easily optimized with a proper optmization algorithm such as Newton-Step method.

The weak classifier procedure can be summarized into the following pseudo code.

Given: Sample set $s=\{(x_1, v_1, y_1), K, (x_m, v_m, y_m)\}$,
finite feature set $P=\{f_k(x; \theta_k)\}$, $1 \leq k \leq n$,
and the current distribution Dt(i).
For k=1, . . . , n (each feature)
Group all samples into different bins $$S_j = \{(x_i, v_1, y_1) | x_1 \in bin_j\}, 1 \leq j \leq p$$

For j=1, . . . , p (each bin)
Using Newton-step method to compute $$c_k^* = \arg\min_{c_k}\left(\sum_{S_k} D_t(i) \exp(-y_i(v_i \cdot c_k))\right) \tag{13}$$

Create a weak classifier $h(x; \theta_k, \mu_k)$ based on $\{c_k'\}$, and use equation 5 to calculate its corresponding normalization factor $Zt(\theta k, \mu k)$.

Return the optimal weak classifier $$h_t^*(x; \theta, \mu) = \arg\min_{h(x;\theta_k,\mu_k)}(Z_t(\theta_k, \mu_k)) \tag{14}$$

In summary, the novel contributions of MVFD of this and several embodiments according to the invention include the WFS tree, the Vector Boosting algorithm and the weak classifiers based on piece-wise function.

Figure 11:
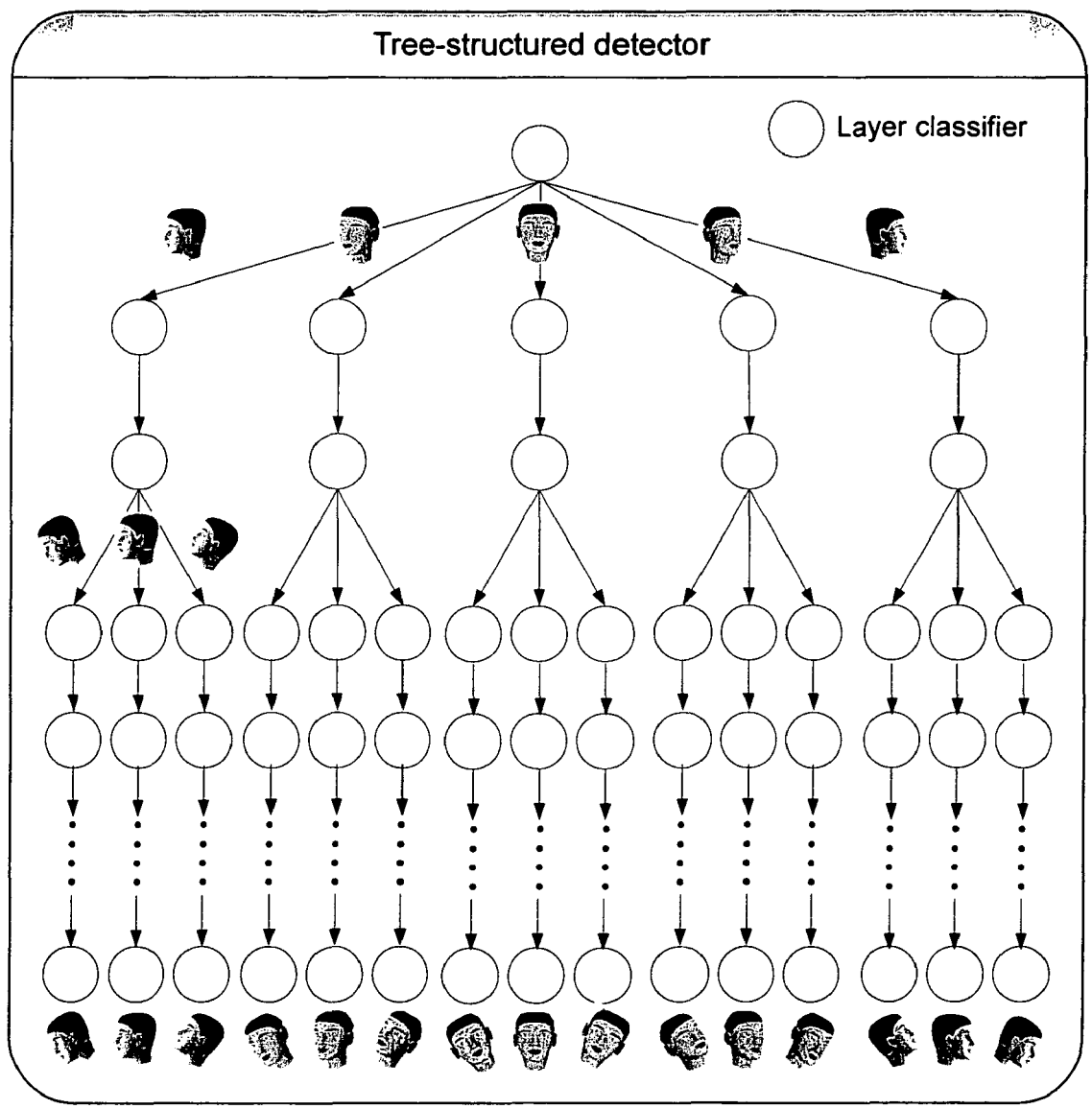
FIG. 11 is a schematic diagram showing a tree-structured detector of the according to an embodiment of the invention.

As shown in FIG. 11, a strong classifier is contained in each node and is obtained through the Vector Boosting algorithm by a plurality of weak classifiers; the weak classifier performs feature extraction based on integral image Haar feature and performs weak classification using a piece-wise function implemented with Look Up Table (LUT). Each strong classifier discriminates faces from non-faces to reject non-faces and output remaining to corresponding nodes in the lower layer.

Each the leaf node has only one branch that corresponds to a plurality of single-branch connected child leaf nodes; the leaf nodes and child leaf nodes thereof constitute a cascade classifier to reject non-faces and obtain the faces of corresponding views.

Embodiment 2

Figure 8A:
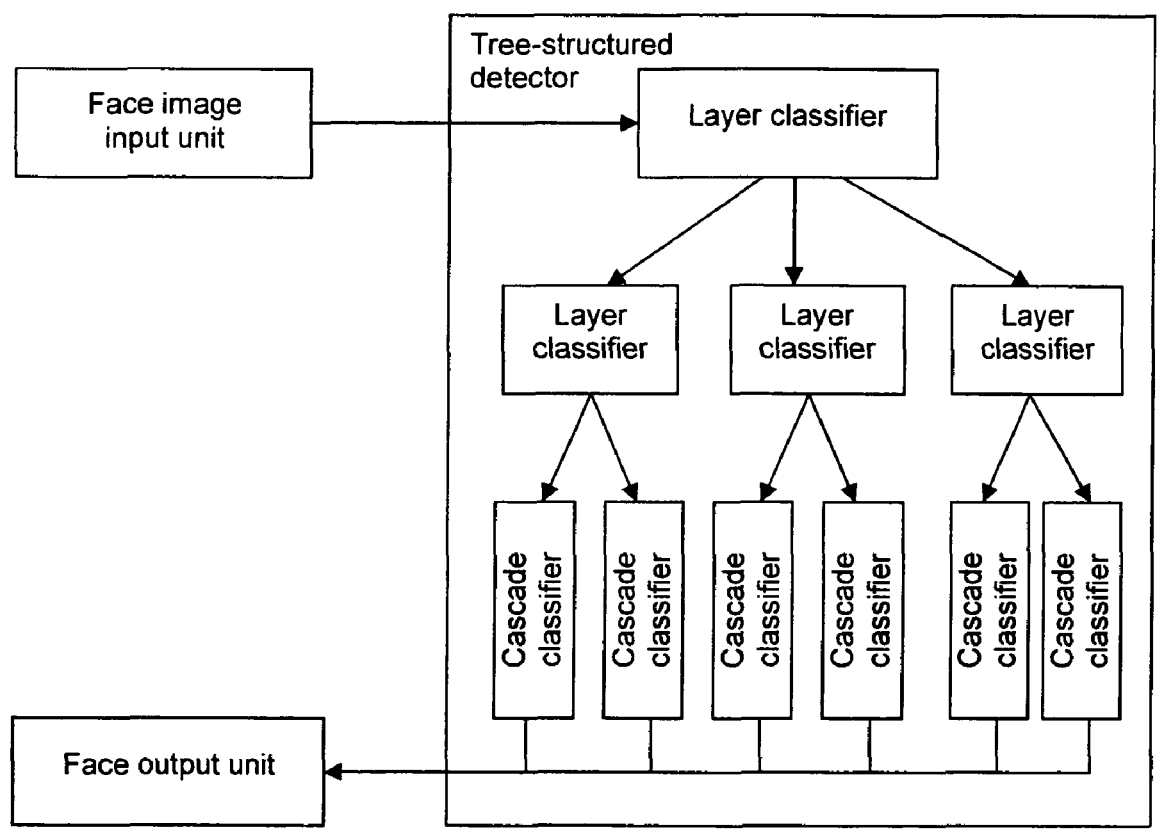
FIGS. 8A and 8B are block diagrams showing the configuration of the apparatus according to an embodiment of the invention.
Figure 8B:
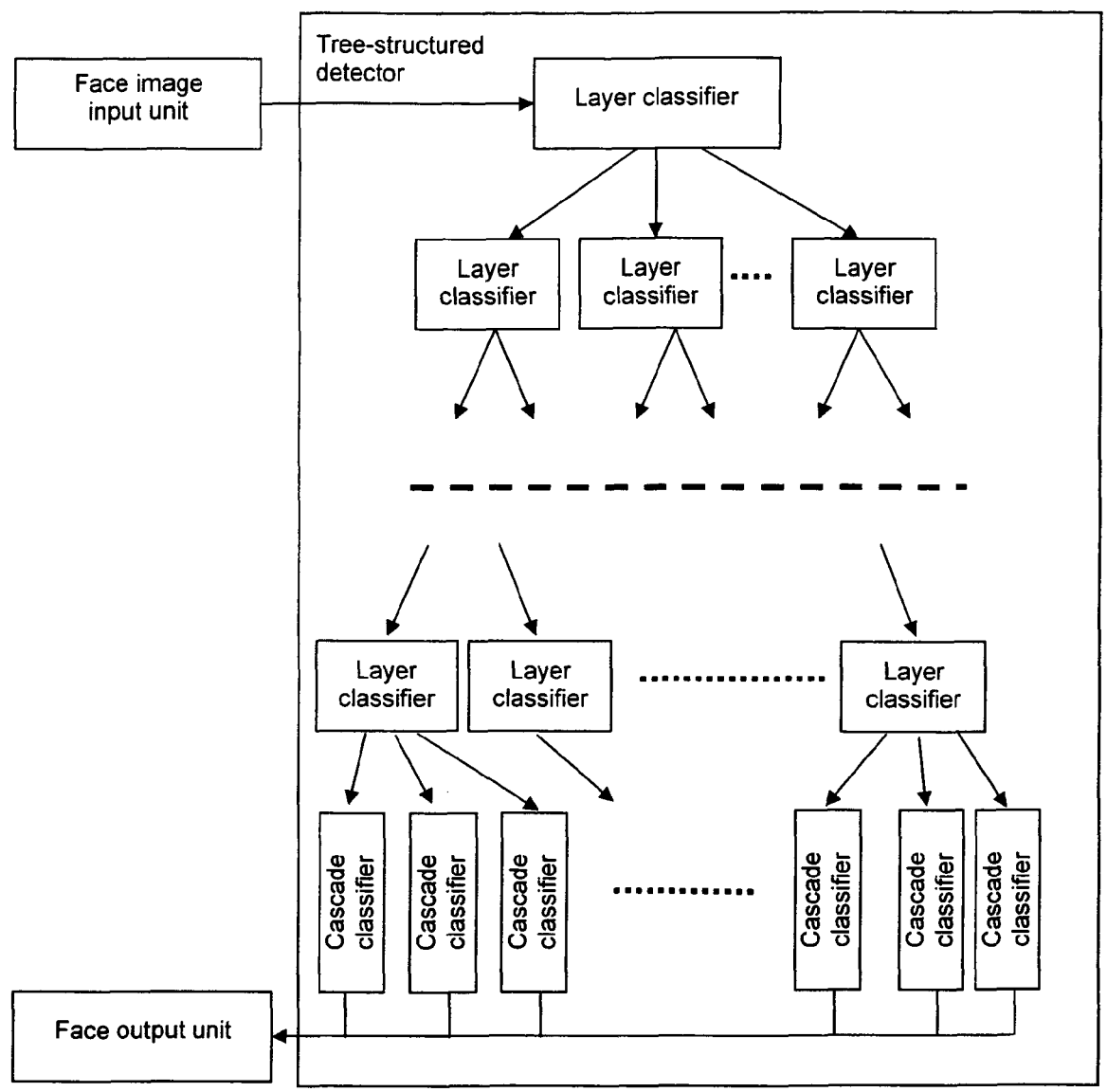

FIGS. 8a and 8b are functional block diagrams of face detection apparatus according to a second embodiment of the invention that is implemented by a CPU that plays the role of an input unit, an output unit and a tree-structured detector. Below, the functions of face detection apparatus according to this embodiment will be explained referring to FIGS. 8a and 8b.

Face Image Input Unit

The face image input unit plays a role of an interface for inputting data of the original image (hereafter referred as original image data) of a human image into face detection apparatus. The original image data may be still image data or dynamic image data. Through the face image input unit, the original image data is input into the face detection apparatus from the outside of the face detection apparatus. The face image input unit may adopt a structure of any technique of inputting the original image data into the face detection apparatus.

For instance, the original image data may be input into the face detection apparatus via network, such as Local Area Network and World Wide Web. In such case, the input unit may adopt a structure of network interface. Moreover, the original image data may be input into face detection apparatus from digital camera, scanner, personal computer, storage device (such as hard disk drive device) and the like. In such case, the input unit may adopt a structure based on the standards of connecting the digital camera, personal computer, storage device and the like to the face detection apparatus for data communication, for instance, the standards of wired connection such as Universal Serial Bus (USB) and Small Computer System Interface (SCSI), and wireless connection such as blue tooth and the like. In addition, the original image data stored in a storage medium, such as various flash memories, soft disk (registered trademark), compact disk (CD) and digital versatile disc (DVD), may be input into the face detection apparatus. In such case, the input unit may adopt a structure of employing an apparatus of reading data out of the storage medium, such as flash memory reader, soft disk drive device, CD drive device and DVD drive device.

Moreover, the face detection apparatus according to this embodiment can be contained in a pick-up apparatus such as digital camera and the like, or in a pick-up apparatus where a digital camera is provided, such as Personal Digital Assistant (PDA). The picked-up human images are input into the face detection apparatus as the original image data. In such case, the input unit may adopt a structure of using Charge-Coupled Device (CCD), Complementary Metal-Oxide Semiconductor (CMOS) sensor and so on, or adopt a structure of an interface for inputting the original image data picked up by CCD and CMOS sensors into the face detection apparatus. Besides, the human image input into the image output device may be input as output data of the image output device into the face detection apparatus as the original image data. In such case, the input unit may adopt a structure of employing an apparatus of transforming the original image data input into these image output devices into the data able to be handled in the face detection apparatus.

Furthermore, the input unit may adopt a structure of being suitable to the above various cases.

A function to cut the image data of the sub-window from the data of the present image while moving the sub-window and send it to the face detector may be included in the face image input unit. By adding this function, it is possible to detect a face from the image including a background.

Face Output Unit

The output unit plays a role of an interface for outputting the data representing whether the tree-structured detector has detected faces of human and/or the data representing the position and size of the detected faces to the outside of the face detection apparatus. The output unit may adopt a structure of any prior technique of outputting the data related to human face detection results from the face detection apparatus.

For instance, the data related to the detection results may be output from the face detection apparatus via network. In such case, the output unit may adopt a structure of using network interfaces. In addition, the data related to detection results may be output to other information process devices like personal computer and storage devices. In such case, the output unit may adopt a structure based on the standards of connecting the other information process devices like personal computer or the storage devices to the face detection apparatus for data communication. Besides, the data related to detection results may be output (written) to a storage medium. In such case, the output unit may adopt a structure of employing an apparatus of writing the data into these storage devices or storage medium, such as flash memory recorder, soft disk drive device, CD-R drive device and DVD-R drive device.

An example of the specific purposes of data output from the output unit will be explained. For instance, the data output from the output unit may be used in order to output graphics representing face regions detected by the face detection apparatus to a display device such as a monitor. In such case, the output unit may adopt a structure of an interface able to communicate data with a display device such as a monitor, and also may adopt a structure of an interface of connecting to a display device such as a monitor or submitting the data to a built-in information process device. FIG. 6 shows an example displayed on the monitor. In addition, the output unit may adopt a structure wherein a digital camera performs controls related to the photograph, such as focus control, exposure compensation and the like, with the data output from the output unit as reference in the case that face detection apparatus is contained in the digital camera or various devices having digital cameras. In such case, the output unit may adopt a structure of an interface able to communicate data with the information process device inside the digital camera. Besides, the output unit may adopt a structure wherein the information process device determines process regions and process contents of the image compensation process with the data output from the output unit as reference in the case that for instance, the face detection apparatus is contained in an information process device performing image compensation process and is connected to such information process device. In such case, the output unit may be for instance a structure of an interface able to communicate data with such information process device and the devices therein.

Furthermore, the output unit may adopt a structure of being suitable to the above various cases.

Face Detector

1. Basic Configuration of Tree-Structured Detector

FIG. 11 shows the configuration of tree-structured multi-view face classifier, wherein each node contains a layer classifier (that is, strong classifier), and each layer classifier is obtained by many LUT-type weak classifiers based on Haar features through continuous AdaBoost algorithm.

The Haar feature is a kind of simple rectangular feature. Each Haar feature is generally defined as difference of pixel gray scale of two regions in an image sub-window, each region being configured by a plurality of rectangles (basic blocks). Although the Haar feature's ability to depict a mode is weaker than some other more complicated feature, it becomes the ideal feature selected by weak classifier because it can be fast calculated through an integral image.

The properties of a Haar feature include length and width of a basic block, position of the feature relative to sub-window and its class (shape). The feature varies with sub-windows in the detection procedure, and keeps the relative position and relative size with respect to sub-window constant. In order to accelerate features calculation, some redundant information will be pre-calculated for each Haar feature when the sub-window varies.

2. LUT-Type Weak Classifier

A LUT-type weak classifier may be trained according to each Haar feature. The weak classifier divides the value range of Haar feature into n equal parts, and gives confidence of binary classification (whether it is face or not) for each equally divided region, where n is the length of LUT Different from the previous LUT-type weak classifiers, the weak classifier of this embodiment according to the invention contains multi-LUTs that give confidence information of faces with respect to different views based on the same Haar feature. In short, the classifiers of different views share the same Haar feature (shared feature or mutual feature). The advantage is that, compared with the methods of treating the faces of different views as one ensemble class for judgment, multi-LUT-type weak classifier is capable of giving the classification information for faces of each view synchronously, thereby it can achieve a better classification; while compared with the methods of individually training classifiers for each view, multi-LUT-type weak classifier improves the utilization efficiency of each Haar feature so as to use less Haar features under the same correct rate and enhance the detection speed accordingly.

Figure 9:
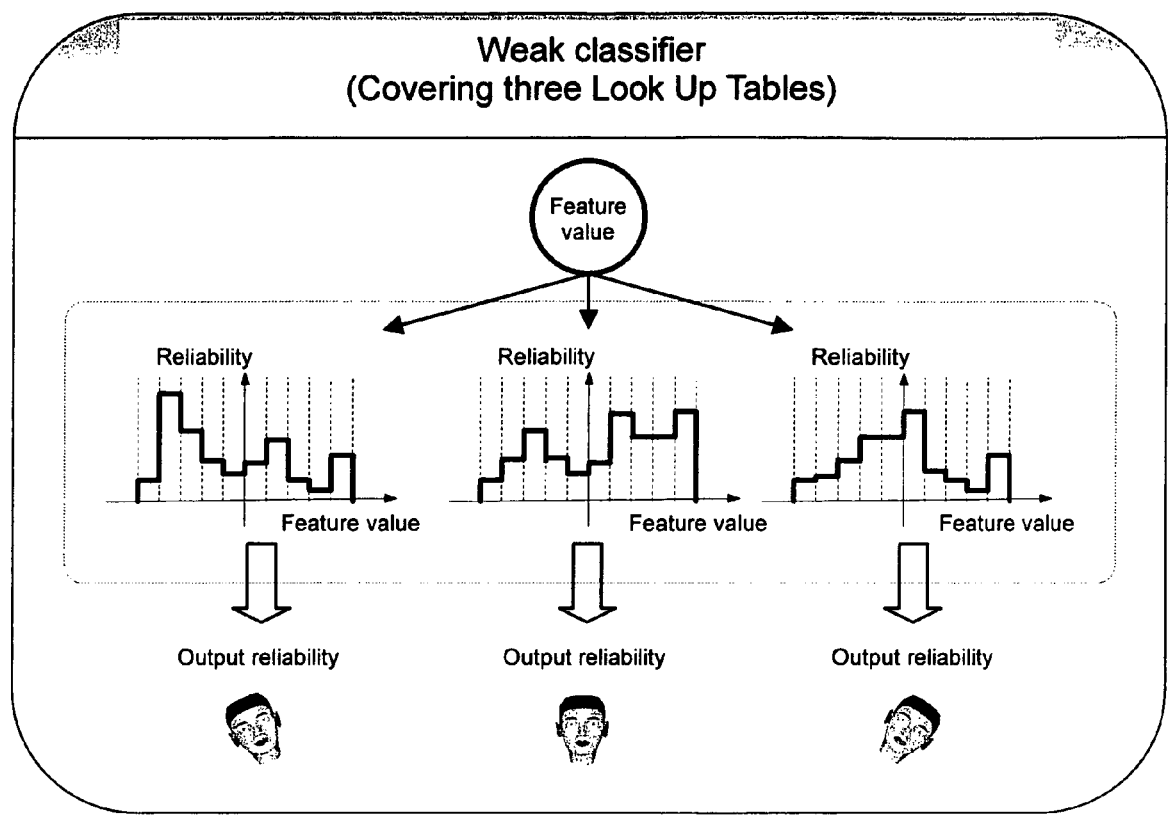
FIG. 9 is a schematic diagram showing an example of a weak classifier having three Look Up Tables.

FIG. 9 shows an example of a multi-LUT-type weak classifier, wherein three LUTs are provided to output confidences for the cases of 30°, 0, −30° RIP, respectively. Here, subscripts (indexes) of three LUTs are calculated from the same Haar feature.

The continuous AdaBoost algorithm, as one of the weak learning methods, is capable of linearly combining a plurality of weak classifiers into a strong classifier. The weak learning procedure of the continuous AdaBoost algorithm is based on a large amount of calibrated sample data: it adjusting weight of a sample, selecting continually new weak classifiers to combine linearly with existed classifiers to reduce the false rate in training sets until it converges. Moreover, related theorem has proved that the algorithm's generalization ability is rather good for test sets.

A serial of strong classifiers may be obtained by applying the continuous AdaBoost algorithm to LUT-type weak classifiers and using different training parameters and different classes of samples. Here each strong classifier is called a "layer classifier" (the linear combination of a set of weak classifiers is regarded as one layer). For a sub-window to be detected, a layer classifier may give confidences of the sub-window for the faces of various different views (The number of different views is equal to the number of LUTs of weak classifiers in this layer classifier).

Figure 10:
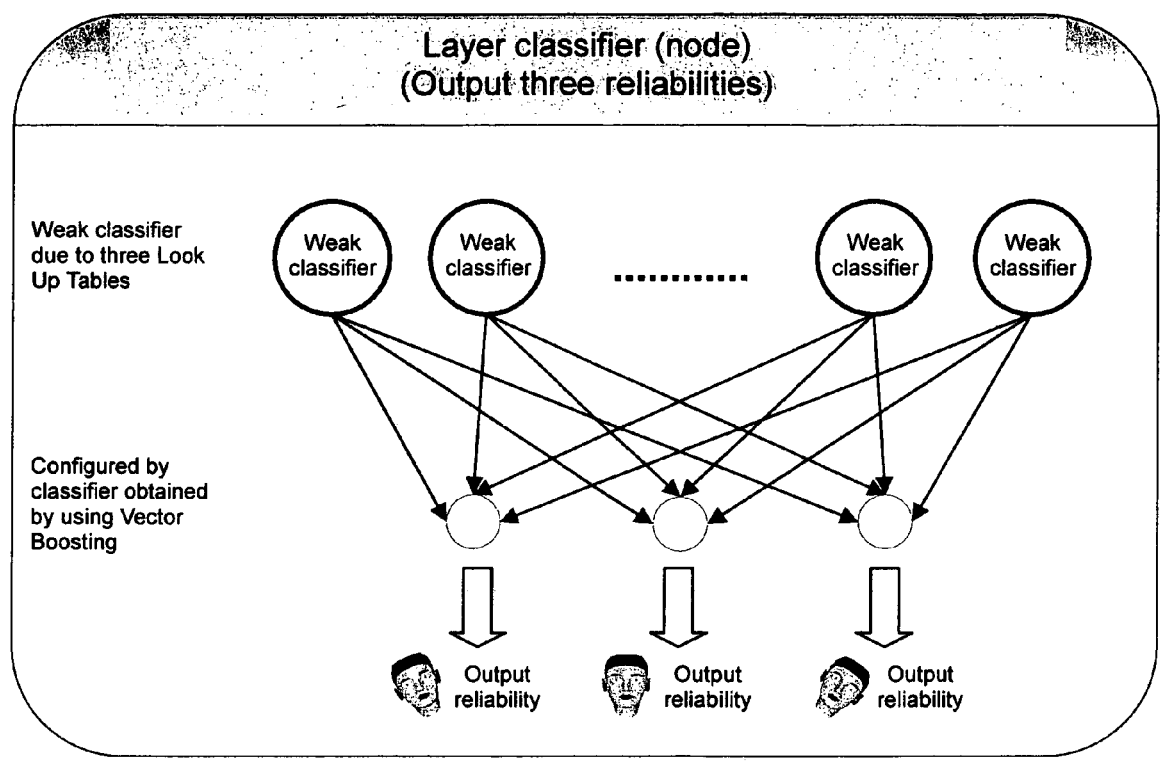
FIG. 10 is a schematic diagram showing an example of a layer classifier having three confidence outputs.

FIG. 10 shows an example of a layer classifier obtained by the linear combination of weak classifiers shown in FIG. 9 through continuous AdaBoost algorithm, the layer classifier being capable of outputting the confidences of whether it is face or not for the faces with 30°, 0, −30° RIP, FIG. 11 shows the configuration of current tree-structured detector, wherein each node is configured by a layer classifier and the branch number of each node is equal to the number of classes of face views whose confidences can be output by this layer classifier.

Taking the root node of the tree-structured detector as an example: the root node can output five confidences for five views of left full profile, left half profile, frontal, right half profile and right full profile respectively, so the root branching root has five child nodes. If an image sub-window's confidence output in a face view is more than a certain threshold through the detection of root node, the sub-window image will be input into corresponding child node for further detection.

There are three confidences output for the nodes in the third layer in FIG. 11, which correspond to the faces with 30°, 0, −30° RIP respectively.

The tree-structured classifier rejects non-faces layer by layer, and detects the sub-windows eventually arriving at the leaf node as the faces. Meanwhile it determines the views of the faces according to the different leaf nodes at which the sub-windows arrive. The face views that can be covered by a tree-structured detector include 180° ROP (i.e. front and profile variation of left-right rotation.) and 90° RIP.

3. Work Procedure of the Tree-Structured Detector

Sub-window search is that for a gray scale image sub-window input into tree-structured classifier and for various poses being covered by the classifier, the tree-structured classifier may output the sub-window as the confidence of faces of a pose if the sub-window passes detection. For the face detection in pictures, conventionally, it is needed to enumerate each of sub-windows in pictures, and detect them through tree-structured classifier, then obtain the detection results of whole pictures. For a picture of 320×240 pixels, there are totally 5257476 rectangular sub-windows with a size from 24×24 to 240×240. The time complexity of full search is undesirable.

To deal with this, in the aspect of sub-window scale, a pixel-by-pixel increment may be changed into increment in ratio, i.e. a scale ratio is multiplied every time; in the aspect of sub-window position, point-by-point scanning may be changed into variable-resolution scanning, i.e. first scanning with coarse-resolution grids, and if there is a large possibility to present faces, then scanning the surrounding with fine-resolution grids.

Figure 12:
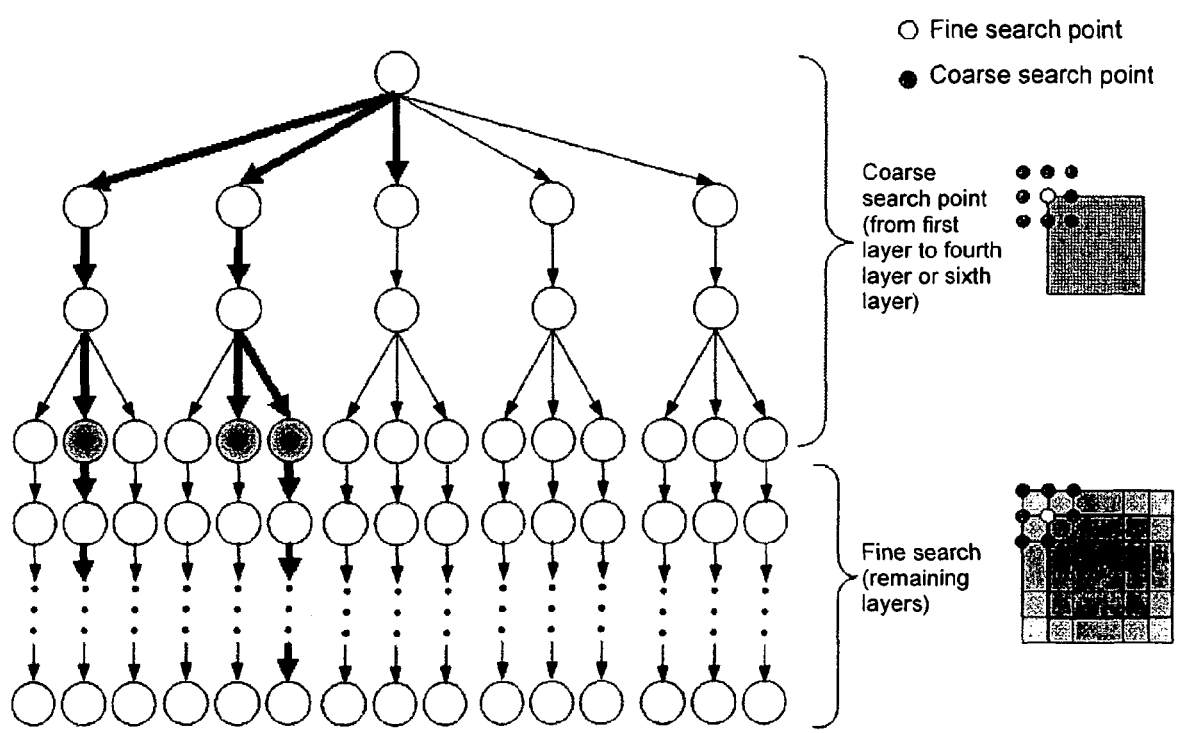
FIG. 12 is a schematic diagram showing an example of the detection procedure for sub-windows in the tree-structured detector.

FIG. 12 shows a possible search procedure of tree-structured detector.

A bold arrow represents a possible search path. Grey nodes represent the nodes remaining in a search queue after the coarse search ends in such case.

The sub-window detection procedure is:

The detection for each sub-window comprises two steps of coarse search and fine search. The comparison between coarse search and fine search is given below.

TABLE 1

|  | Coarse search | Fine search |
| --- | --- | --- |
| number of layers searched | 4-6 layers | Remaining layers |
| Search manner | Width-first-search | Simple search from top down |

During the coarse search, the corresponding Haar feature is calculated according to sub-windows to be detected for each node (layer classifier) at which the searcHaarives, thereby one or more confidences (determined by branch number of a node) are obtained. For a branch whose confidence is more than a threshold, the nodes towards which the branch passes are added to the search queue. Continuing WFS until the layer number of nodes in the queue reaches the largest layer number defined in the coarse search.

Now, if the queue is not empty, it is considered that there is/are face(s) in this region and a fine search is performed for sub-windows around the current sub-window. Although the sub-windows subjected to fine search are different from that of coarse search, the search queue in the coarse search is inherited to continue the searching because the sub-windows are near in distance (no more than half-coarse-step). If one or more leaf nodes can be arrived at, each leaf node corresponds to a face detection result, which is recorded and output.

Approximately 75000 face images have been collected and labeled to verify the implementation of this embodiment, including 30000 frontal ones, 25000 half profile ones and 20000 profile ones. Some of them are shown below. As shown in FIG. 2, all faces are first divided into 5 categories according to left-right ROP, and then each category is subsequently split into 3 views, each of which covers 30° RIP. These 15 views also cover [−30°, +30°] up-down ROP. Each sample is normalized and resized into 24×24.

Given: the false report rate f and the detection rate d for each node; the expected overall false sample rate F for all views; the sample group of the subject (face) is set at P and the sample group of the non-subject (non-face) is set at N.

Let current node E=the root node of the tree

Training procedure of the node E is given below.

From P and N, collect samples that have passed all E's parent nodes, form two training sets p and n with proper size.

With p and n, use the Vector Boosting to train a strong classifier G(x) until the required detection rate d and false report rate f are achieved.

Evaluate current overall false report rate $F_{cur}$.

If $F_{cur} > F$

For each of E's child nodes $E_{child}$, let $E = E_{child}$ and recursively call the training procedure of the node E.

As a result of the experiment on this embodiment, scaling the scanning window from 24×24 to 256×256 with the scale ratio 1.25, MVFD of this embodiment takes only about 40 ms on the detection of a 320×240 image. Compared with the individual cascade method described by Wo, et al that reported 80 ms, the consumed time is reduced by a half. Since MVFD covers ±45° RIP, it is simply rotated by 90°, 180° and 270° to construct three detectors in order to fully cover 360° RIP, and these detectors work together to deal with the rotation invariant problem. Its speed is about 11 fps on a 320×240 video sequence, on a Pentium 4, 2.8 Ghz PC, which is about 1.5 times faster than the method proposed by Wo, et al (250 ms per frame). The significant improvement is due to the WFS tree structure and its corresponding training algorithm: the Vector Boosting.

As previously discussed, the Vector Boosting algorithm used in several aspects of the present invention can be regarded as a structure expansion for the AdaBoost algorithm, in which if properly predefining projection vectors it works exactly as the classical Real AdaBoost algorithm. The Vector Boosting algorithm covers the classical AdaBoost algorithm. The main contribution of the Vector Boosting is to deal with both the simple binary classification version and the complicated multi-class multi-label version of the classical Adaboost algorithms in a unified framework. The classical simple binary classification limits the output of classifier in a scalar space for optimization, and the multi-class problem is decomposed into a plurality of independent binary classification problems to deal with them respectively. Although such method is clear and direct, it is not tenable for complicated multi-class multi-label problems and difficult to build some link among decomposed binary classification problems.

In addition, the version of the Vector Boosting algorithm of used in several aspects of the present invention can deal with the complicated problems including a plurality of decomposed binary classification problems in the same vector output space, which unifies the prior Adaboost algorithms; Moreover, Vector Boosting will take into account the correlation among different classification problems, that is to say, it is an extended version of the Adaboost algorithm. Although the Vector Boosting algorithm is developed for the MVFD problem, it could be applied to other complicated classification problems as well.

It is to be understood that the components and (processing) methods of the embodiments used to describe several aspects of the invention can be combined without departing from the spirit and the scope of the invention.

What is claimed is:

1. An apparatus for detecting from an image a particular subject comprising:
   an image input unit; and
   a tree-structured detector for classifying an image inputted from the image input unit;
   wherein the tree structure detector has a root node that covers subject subspaces of all views of a subject to be branched;
   a child node branched from the root node covers subject subspaces corresponding to at least one view of the subject;
   each of the root node and the child node contains a plurality of weak classifiers and collects the output of each weak classifier for each of the divided subject subspace so as to determine which child node in the adjacent lower layer the image should be shifted to.

2. The apparatus for detecting from an image a particular subject according to claim 1, further comprising:
   a non-branching cascade classifier to be connected from a leaf node divided into one subject subspace;
   wherein the cascade classifier detects the subject of the view shown by the subject subspace by rejecting the non-subject.

3. The apparatus for detecting from an image a particular subject according to claim 1,
   wherein the tree-structured detector carries out width-first-search.

4. The apparatus for detecting from an image a particular subject according to claim 1, wherein, each node is trained by using a Vector Boosting algorithm so as to determine which child node in the adjacent lower layer the image should be branched from the root node or the child node.

5. The apparatus for detecting from an image a particular subject according to claim 1,
   wherein the particular subject and the subject are human faces.

6. The apparatus for detecting from an image a particular subject according to claim 1,
   wherein each of the nodes covers a strong classifier, respectively, and classification of the strong classifier is determined due to the collection of the output values of a plurality of weak classifiers.

7. The apparatus for detecting from an image a particular subject according to claim 6,
   wherein the weak classifier classifies the view of the subject on the basis of Haar feature obtained from the image.

8. The apparatus for detecting from an image a particular subject according to claim 6,
   wherein the weak classifier classifies the image by using a Look Up Table.

9. The apparatus for detecting from an image a particular subject according to claim 8,
   wherein the Look Up Table has fine-resolution grids in the initial some layers of the tree-structured detector, and it has coarse-resolution grids in the latter layer thereof.

10. The apparatus for detecting from an image a particular subject according to claim 1,
    wherein the subject subspace covers RIP (rotation in plane) and/or ROP (rotation out-of-plane) of the subject to be detected, and the subject subspace is divided into a plural views of the subject.

11. The apparatus for detecting from an image a particular subject according to claim 10,
    wherein the root node covers the subject subspace due to ±90° ROP.

12. The apparatus for detecting from an image a particular subject according to claim 10,
    wherein the root node covers the subject subspace due to ±45° RIP.

13. The apparatus for detecting from an image a particular subject according to claim 12,
    wherein the apparatus can classify the view of the subject of 360° RIP by rotating the tree-structured detector or the inputted image by 90°, 180°, and 270°.

14. The apparatus for detecting from an image a particular subject according to claim 1, further comprising:
    an output device for outputting the data indicating if the subject is detected by the tree-structured classifier or not and/or the data indicating the location and the size of the detected subject.

15. A method for detecting a particular subject from an image;
    wherein an information process device executes the steps comprising:
    inputting the image in a root node of a tree-structured detector;
    inputting the image in a plurality of weak classifiers and collecting the output of each weak classifier for each divided subject subspace; and determining which child node in the adjacent lower layer the image should be shifted to in each branched node of the root node and a child node of the tree-structured detector based on the output of each weak classifier for each divided subject subspace.

16. A method for configuring a tree-structured detector for detecting a particular subject from an image, said method comprising:

executing with an information process device the steps comprising:

configuring a node for classifying the image into a tree structure;

configuring a root node of the tree structure to cover subject subspaces of divided all views of the subjects and have a plurality of branches, wherein each branch is connected to a child node, and the child node corresponds to at least one view of the subjects;

configuring a child node covering at least two subject subspaces to have a plurality of branches, wherein each branch is connected to the child node of the adjacent lower layer, and each child node of the adjacent lower layer covers at least one subject subspace;

configuring a child node covering at least one subject subspace to be made into a leaf node of the tree structure; and configuring each of the root node and the child node in such a manner that an image is inputted in a plurality of weak classifiers and the outputs of each weak classifier are collected for each divided subject subspace to determine to which child node in the adjacent lower layer the image should be shifted.

* * * * *